US 6,724,912 B1

(12) United States Patent
Carr et al.

(10) Patent No.: US 6,724,912 B1
(45) Date of Patent: Apr. 20, 2004

(54) DIGITAL WATERMARKING OF PHYSICAL OBJECTS

(75) Inventors: J. Scott Carr, Beaverton, OR (US); Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/562,524

(22) Filed: May 1, 2000

Related U.S. Application Data

(63) Continuation-in-part of application No. 09/127,502, filed on Jul. 31, 1998, now Pat. No. 6,345,104.

(51) Int. Cl.[7] ............................................... H04K 1/00
(52) U.S. Cl. ...................... 382/100; 428/195.1; 428/916
(58) Field of Search ................................ 382/100, 135, 382/232; 713/176; 380/51, 54; 283/72, 74, 85, 93, 94, 107, 109, 110, 111, 113; 428/195, 201, 203, 204, 206, 207, 211, 916, 919, 195.1, 211.1; 430/9, 10, 11, 13, 14, 15, 18; 503/227

(56) References Cited

U.S. PATENT DOCUMENTS

| | | | | |
|---|---|---|---|---|
| 4,370,057 A | * | 1/1983 | Lee | 356/71 |
| 4,442,541 A | * | 4/1984 | Finkel et al. | 382/7 |
| 5,161,829 A | * | 11/1992 | Detrick et al. | 283/91 |
| 5,380,044 A | * | 1/1995 | Aitkens et al. | 283/67 |
| 5,568,550 A | | 10/1996 | Ur | 380/3 |
| 5,698,333 A | * | 12/1997 | Benoit et al. | 428/516 |
| 5,710,636 A | | 1/1998 | Curry | 358/298 |
| 5,772,250 A | * | 6/1998 | Gasper | 283/114 |
| 5,919,730 A | * | 7/1999 | Gasper et al. | 503/201 |
| 6,103,353 A | * | 8/2000 | Gasper et al. | 428/195 |
| 6,286,761 B1 | * | 9/2001 | Wen | 235/468 |

FOREIGN PATENT DOCUMENTS

| | | | | |
|---|---|---|---|---|
| DE | 29 43 436 A1 | * | 5/1981 | G06K/19/06 |
| EP | 0789480 A2 | | 8/1997 | H04N/1/00 |
| WO | WO95/04665 A1 | | 2/1995 | B44F/1/12 |
| WO | WO 98/33658 A1 | * | 8/1998 | B42D/15/00 |

OTHER PUBLICATIONS

Haslop, "Security Printing Techniques," in *Optical Document Security*, edited by R. van Renesse, 1994, Artech House, pp. 111–126.*

Nusmeier et al., "Optical Security in Laminates," in *Optical Document Security*, edited by R. van Renese, 1994, Artech House pp. 317–334.*

Szepanski, "A Signal Theoretic Method for Creating Forgery–Proof Documents for Automatic Verification," *Proceedings 1979 Carnahan Conference on Crime Countermeasures*, May 16, 1979, pp. 101–109.

(List continued on next page.)

*Primary Examiner*—Andrew W. Johns
(74) *Attorney, Agent, or Firm*—William Y. Conwell; Digimarc Corporation

(57) ABSTRACT

A machine readable indicia is formed in a blank printable medium. The indicia may be formed in an opacification layer applied to a translucent substrate, or may be formed in a laminate layer. The indicia is optically detectable from the exterior of the medium, even if the indicia is not formed on the medium's exterior surface. One particular indicia is a seemingly-random weave-like pattern of lines defined in response to (1) a first user control that determines a degree of randomness of the line(s), (2) a second user control that determines a modulation effect to be applied to the line(s), and (3) the bits to be represented thereby. Many other indicia, including checkerboards, barcodes, data glyphs, etc., can also be used.

48 Claims, 1 Drawing Sheet

OTHER PUBLICATIONS

U.S. patent application Ser. No. 09/074,034, Rhoads, filed May 6, 1998.
U.S. patent application Ser. No. 09/127,502, Rhoads, filed Jul. 31, 1998.
U.S. patent application Ser. No. 09/185,380, Davis et al., filed Jul. 3, 1998.
U.S. patent application Ser. No. 09/287,940, Rhoads, filed Apr. 7, 1999.
U.S. patent application Ser. No. 09/293,601, Rhoads, filed Apr. 15, 1999.
U.S. patent application Ser. No. 09/293,602, Rhoads, filed Apr. 15, 1999.
U.S. patent application Ser. No. 09/342,972, Rhoads, filed Jun. 29, 1999.
U.S. patent application Ser. No. 09/428,359, Davis et al., filed Oct. 28, 1999.
U.S. patent application Ser. No. 09/431,990, Rhoads, filed Nov. 3, 1999.
U.S. patent application Ser. No. 09/465,418, Rhoads et al., filed Dec. 16, 1999.
U.S. patent application Ser. No. 09/761,280, Rhoads, filed Jan. 16, 2001.
U.S. patent application Ser. No. 09/761,349, Rhoads, filed Jan. 16, 2001.
U.S. patent application Ser. No. 09/765,102, Shaw, filed Jan. 17, 2001.

* cited by examiner

DIGITAL WATERMARKING OF PHYSICAL OBJECTS

RELATED APPLICATION DATA

The present application is a continuation-in-part of application Ser. No. 09/127,502, filed Jul. 31, 1998 (now U.S. Pat. No. 6,345,104).

The present application is also related to applications Ser. No. 09/437,357, filed Nov. 10, 1999 now abandoned; Ser. No. 09/074,034, filed May 6, 1998 (now U.S. Pat. No. 6,449,377); Ser. No. 09/234,780, filed Jan. 20, 1999 (now abandoned); Ser. No. 09/433,104, filed Nov. 3, 1999 now U.S. Pat. No. 6,636, 615; Ser. No. 09/503,881, filed Feb. 14, 2000 (now U.S. Pat. No. 6,614,914 and application Ser. No. 09/553,112, filed Apr. 20, 2000 (now abandoned).

The present application is also related to applications Ser. No. 09/562,516 and 09/562,049 both filed herewith.

The present application is also related to the assignee's U.S. Pat. No. 5,862,260, 5,850,481 and 5,841,886.

FIELD OF THE INVENTION

The present invention relates to processing of physical media (e.g., blank printing stock, product packaging, catalogs, advertisements, etc.) to impart a machine-readable indicia (e.g., a plural-bit digital watermark) thereto.

BACKGROUND AND SUMMARY OF THE INVENTION

Digital watermarking technology, a form of steganography, encompasses a great variety of techniques by which plural bits of digital data are hidden in some other object without leaving human-apparent evidence of alteration.

Most commonly, digital watermarking is applied to digital objects, such as digital image, video, and audio. In the case of images, slight changes can be made to local luminance or color values to effect the encoding. These changes can later be detected by a computer, and analyzed to discern the watermark information represented thereby.

Digital watermarking techniques can also be applied to traditional physical objects, including blank paper. Such blank media, however, presents certain challenges since there is no image that can serve as the carrier for the watermark signal.

The assignee's U.S. Pat. 5,850,481 notes that the surface of a paper or other physical object can be textured with a pattern of micro-indentations to steganographically encode plural-bit information. The texturing is optically discernible, e.g., by a scanner, permitting the −/+ digital data to be decoded from scan data corresponding to the paper object.

In application Ser. No. 09/127,502, the present assignee taught various other arrangements by which blank media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analysis of scan data from the media, however, reveals slight localized changes, permitting the multi-bit watermark payload to be discerned. Such printing can be by ink jet, dry offset, wet offset, xerography, etc.

Other techniques disclosed in the '502 application extend the texturing techniques first set forth in the '481 patent, e.g., by employing an intaglio press to texture the media as part of the printing process (either without ink, or with clear ink).

In one aspect, the present specification further develops and extends the techniques disclosed in the '502 application.

For example, printable media—especially for security documents (e.g., banknotes) and identity documents (e.g., passports)—is increasingly fashioned from synthetic materials. Polymeric films, such as are available from UCB Films, PLC of Belgium, are one example. Such films may be clear and require opacification prior to use as substrates for security documents. The opacification can be effected by applying plural layers of ink or other material, e.g., by gravure or offet printing processes. (Suitable inks are available, e.g., from Sicpa Securink Corp. of Springfield, Va.) In addition to obscuring the transparency of the film, the inks applied through the printing process form a layer that is well suited to fine-line printing by traditional intaglio methods. Such an arrangement is more particularly detailed in laid-open PCT publication WO98/33658. That application is a pending U.S. counterpart application, now published as U.S. 2003/0003275, A1 which claims priority to Australian application 4847, filed Jan. 29, 1997.

In accordance with certain embodiments of the present invention, a machine readable indicia encoding plural bits (e.g., a digital watermark) is embedded as part of such an opacification process.

Other security documents employ plural substrates bound together in a laminate structure. The laminates variously include paper, polypropylene film, polyethelyne film, polyurethane film, metal film, inks, adhesives, optically-variable devices (e.g., holograms), and other materials. (See, e.g., U.S. Pat. Nos. 5,935,696 and 5,618,630.) Again, in accordance with embodiments of the present invention, plural-bit machine readable indicia can be incorporated in such structures.

The foregoing and additional features and advantages of the invention will be more readily apparent from the following detailed description, which proceeds with reference to the accompanying drawings.

DETAILED DESCRIPTION

As noted, one technique for forming a blank medium suitable for use as a security document is to gravure-print, or otherwise apply, plural layers of material (e.g., ink) to a synthetic substrate. In addition to making the substrate opaque (if it was not already), the layers provide a surface well suited for fine line offset or intaglio printing.

In known techniques, the layers added to the substrate are substantially uniform. In the case of gravure-printing of ink, the gravure printing plates are generally formed with a pattern of grooves designed to apply a substantially uniform layer of ink across the substrate.

Figure 2:
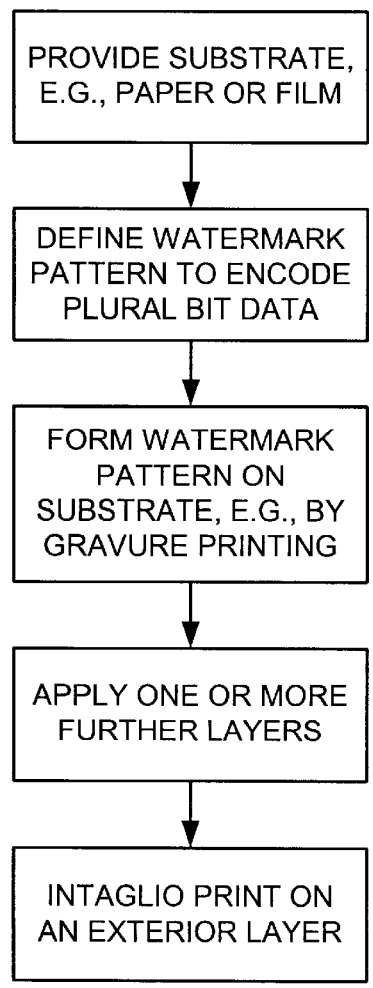
FIG. 2 is a flowchart detailing a method according to one embodiment of the invention.

In accordance with one embodiment of the present invention, one or more of the layers is non-uniform, and instead exhibits localized changes in ink density or tone (e.g., color) to effect a pattern in the resulting medium that is optically detectable from the finished substrate. An exemplary method is shown in FIG. 2.

For gravure opacification, the changes in ink density can be effected by maintaining the same groove patterns as are utilized to effect uniform inking, but changing the groove size on a localized basis to deposit more ink at some locations, less at others. Alternatively, the changes in ink density can be effected by changing the groove patterns, e.g., to move adjoining lines closer together or farther apart, again with the aim of depositing ink more densely in some regions than others. Related techniques, albeit in a somewhat different context, are detailed in the '034 application cited above, and can be employed here.

Another technique of forming a pattern in one or more opacification layers is to use to laser to ablate portions of the layer, selectively removing material to form the desired pattern. Again, such a process results in a change visibly detectable from the exterior of the medium. (Laser ablation of an opacification layer is known in other contexts; see, e.g., laid-open PCT application WO9836913.)

Figure 1:
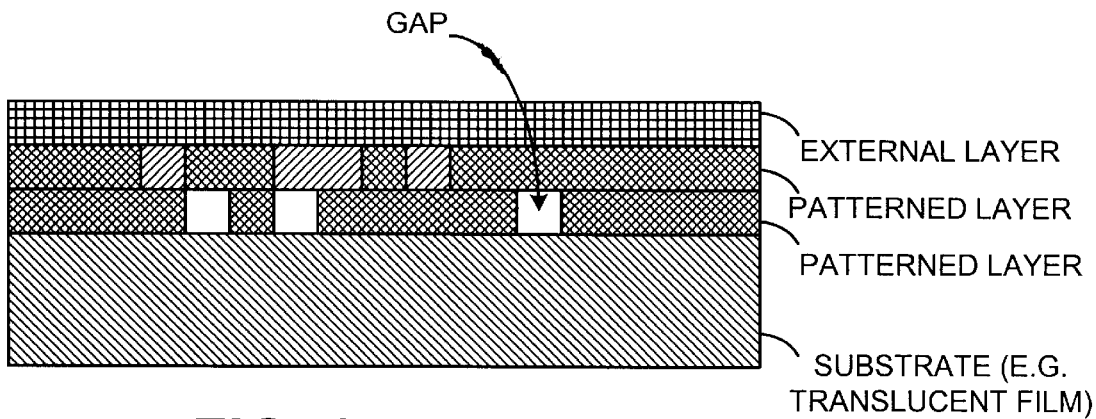
FIG. 1 shows a structure of a document according to one embodiment of the present invention.

In one embodiment, the watermark pattern is effected in only a single of the layers formed on the film substrate. In another embodiment, the pattern is effected in two or more of the layers. (The former approach avoids problem of plate-registration that arise in the latter. The latter may provide a marking that is more durable in the presence of wear than the former.) In still other embodiments, one layer may represent a first set of watermark data, and another may represent a second set of watermark data. One such arrangement is depicted in FIG. 1.

In another form of the invention, a security document medium is prepared in laminate fashion, with one or more of the interior layers formed so as to impart an optically-discernible pattern of contrast discernible from the exterior of the medium. The layer can be printed to form this pattern, or can be shaped to give such a result. The latter approach can employ a swiss cheese-like layer (formed, e.g., by laser cutting), where the holes in the layer give rise to an optical contrast effect from the exterior of the substrate that encodes the plural-bit data payload. The degree of contrast depends on the color of the layer, and the translucency of the exterior layer(s).

In some such embodiments an internal layer is paper, and exterior layers are synthetic. In others, an opposite arrangement is employed.

In the foregoing embodiments, or in embodiments in which a watermark signal is applied by printing to a finished substrate, the watermark can be deposited by ink jet printing or other dithered-technique, where the dither pattern is tailored to effect a luminance profile across a region that encodes a watermark.

The watermarking arrangement detailed in the '112 application can be employed both to the outside of a substrate as well as to a non-exterior component layer (whether laminate or opacification). The algorithm employed in the '112 application can be altered, if desired, to provide a control by which a user can establish the degree of randomness to be included in the traversed path as the line(s) extend from one point to another. Likewise, a control can be provided to change a modulation effect (e.g., sinusoidal) applied to the direction or width of the line as it traverses a region.

It can be advantageous to apply various digital watermarking techniques to security badges and identity cards—of the sort commonly worn by employees at industrial facilities. Such cards are commonly printed by dedicated print stations that include both a personal computer and a specialized card printer. Datacard is one vendor of such systems. Information can be embedded on such cards (or in a non-surface layer and yet still sensible from the card exterior) in watermark form, embodying various data, e.g., the date of issuance, the owner name, an identification number, etc. The information can have the appearance of a tint or wash, as noted above, yet permit ready recovery of the embedded information.

In the foregoing embodiments, the watermark signal can be represented as a checkerboard pattern comprising, e.g., a 96×96 array of elements, where each element is 0.012 inch on a side. Each component element can be light or dark, or intermediate grey-scale values may be used to further reduce visibility. Such checkerboards may be tiled together to span the full width and length of the media.

Alternatively, patterns other than checkerboards can be used. Such patterns (e.g., weave-like patterns), and methods for their generation, are detailed in the '112 and '502 applications cited above.

In most embodiments, the watermark payload is uniform across the medium. In some applications, however, it may be desirable to encode different payloads in different regions of a medium. Such may be the case, for example, in pre-encoding blank pages for magazine stock. Each sheet (ultimately defining two magazine pages on its front and two on its back) may be arranged in columnar form (e.g., 3 columns per page), with each column bearing a different watermark. Still more complex arrangements, e.g., segregating each column into top, middle, and bottom thirds, can of course be used.

In other arrangements, the same watermark may be encoded in different places (e.g., on different sheets of media), but not by using the same pattern. Instead, different patterns can be used in different places to encode the same watermark payload.

The watermark can convey a payload of arbitrary length, commonly in the 2–256 bit range, and perhaps most commonly between 24 and 72 bits. Error correcting coding, such as convolutional coding or BCH coding, can be employed to transform the base payload (e.g., 50 bits) to a longer data string (e.g., 96–1024 bits), assuring robustness in detection notwithstanding some data corruption (e.g., due to wear and tear of the medium, artifacts from scanning, etc.). The bits of this longer string are mapped, e.g., pseudo-randomly, to define the pattern (e.g., checkerboard).

An illustrative watermark-encoding technique is more particularly detailed in application Ser. No. 09/503,881 (but is used without gain control and perceptual analysis since no image is present on the blank medium). The calibration signal there-detailed can be employed to permit decoding notwithstanding rotation or certain other corruptions of the detected watermark data.

While the watermarking technique detailed in the just-cited application is preferred by the present assignee, it should be understood that the principles of the present invention can be employed with essentially any other watermarking technology. A great variety of such techniques are known.

Moreover, the invention finds application beyond "watermarking." Any form of machine-readable indicia, including 1-and 2-D barcodes and data glyphs, may be formed as noted above, and serve to facilitate machine-recognition of the media.

To provide a comprehensive disclosure without unduly lengthening this specification, the above-detailed patents and applications are incorporated herein by reference.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. In a method of forming a printable substrate that includes applying plural layers to a film substrate, an improvement comprising providing a two dimensional pattern earlier defined by a process including applying an algorithmic transformation to a plural bit payload, and from which pattern plural bit payload can be subsequently decoded by applying an inverse transformation process, and tailoring the tone or density of at least one of said layers so as to form said pattern thereby, encoding the substrate with plural bits of digital data.

2. The method of claim 1 in which the pattern comprises a steganographic digital watermark pattern.

3. The method of claim 1 in which the film substrate is translucent, and the layers are opacification layers.

4. The method of claim 1 comprising tailoring the tone or density of at least one internal layer to form said pattern.

5. The method of claim 4 in which the tailoring comprises applying ink to an internal layer by an inkjet printing process.

6. The method of claim 1 in which the tailoring comprises applying ink with a gravure printing plate having grooves of non-uniform thickness formed therein.

7. The method of claim 1 in which the tailoring comprises applying ink with a gravure printing plate having non-uniformly distributed grooves formed therein.

8. The method of claim 1 in which the in pattern is coextensive with the substrate.

9. A printable substrate formed according to the method of claim 1.

10. A banknote printed on the substrate of claim 9.

11. The method of claim 1 in which the method includes said algorithmically transforming of a plural bit payload to define said two dimensional pattern.

12. A printable substrate comprising a laminate structure including at least one internal layer, characterized in that said internal layer is formed with a machine readable indicia encoding plural binary bits, said indicia being optically detectable from outside said substrate, said indicia corresponding to a pattern formed by a process including apply an algorithmic transformation to said plural binary bits, said pattern being subsequently decodable to read the plural binary bits therefrom by application of an inverse transformation.

13. The substrate of claim 12 in which the machine readable indicia is a digital watermark pattern.

14. The substrate of claim 12 in which the machine readable indicia is coextensive with the substrate.

15. The substrate of claim 12 in which at least one internal layer is formed of paper.

16. The substrate of claim 12 in which at least one internal layer is formed of a polymer.

17. The substrate of claim 12 in which at least one external layer is formed of paper.

18. The substrate of claim 12 in which at least one external layer is formed of a polymer.

19. The substrate of claim 12 in which the internal layer has gaps defined therein.

20. The substrate of claim 12 in which the internal layer is printed by an inkjet printing process.

21. The substrate of claim 12 in which the indicia encodes a calibration signal.

22. A method of forming a document, comprising:

providing a two dimensional pattern earlier defined by a process including applying an algorithmic transformation to a first set of plural digital bits, and from which pattern said first set of digital bits can be subsequently decoded by applying an inverse transformation process;

providing a substrate having a face;

forming a first patterned layer over the substrate face, said first layer being formed to include said two dimensional pattern;

inking over the first patterned layer to form a second patterned layer, the patterning of said second layer providing visible artwork or printing associated with said document.

23. The method of claim 22 that includes applying the first patterned layer directly to the substrate face.

24. The method of claim 22 in which the first patterned layer is formed of ink.

25. The method of claim 24 wherein the first patterned layer is formed by applying plural layers of ink to the substrate.

26. The method of claim 22 in which the first patterned layer obscures the transparency of the substrate.

27. The method of claim 22 that comprises applying the first patterned layer by a gravure process using a gravure member having groove sizes that change on a localized basis to deposit more ink at some locations than others.

28. The method of claim 22 that comprises applying the first patterned layer by a gravure process using a gravure member having groove spacings that change on a localized basis to deposit more ink at some locations than others.

29. The method of claim 22 that includes forming voids in a material to define the patterning of the first patterned layer.

30. The method of claim 22 that includes inking said second patterned layer directly on said first patterned layer.

31. The method of claim 22 that includes applying said first patterned layer directly to the face of the substrate, and wherein the second patterned layer also defines a machine readable indicia.

32. The method of claim 22 wherein the substrate is substantially transparent.

33. The method of claim 22 wherein the layers applied over said substrate make the composite document generally opaque.

34. The method of claim 22 that includes forming said first patterned layer using an ink which produces a reflective effect.

35. The method of claim 34 wherein the ink has a composition including copper.

36. The method of claim 34 wherein the ink has a composition including aluminum.

37. The method of claim 22 that includes forming the first patterned layer comprises a reflective foil.

38. The method of claim 22 wherein the first patterned layer is applied by a hot stamping process.

39. The method of claim 22 wherein the patterning of the first layer comprises a steganographic digital watermark pattern.

40. A banknote produced according to the method of claim 22.

41. An identification document produced according to the method of claim 22.

42. The method of claim 22 in which the method includes said algorithmically transforming of a first plural bit payload to define said two dimensional pattern.

43. A method of forming a document, comprising:
  providing a substrate having a face;
  forming a first patterned layer over the substrate face by laser ablating portions of a layer applied over the substrate, the patterning of said first layer defining a machine readable indicia encoding plural first bits of digital data; and
  inking over the first patterned layer to form a second patterned layer, the patterning of said second layer providing visible artwork or printing associated with said document.

44. A method of forming a document, comprising:
  providing a substrate having a face;
  forming a first patterned layer over the substrate face, the patterning of said first layer defining a machine readable indicia encoding plural first bits of digital data; and
  inking over the first patterned layer to form a second patterned layer, the patterning of said second layer providing visible artwork or printing associated with said document;
  wherein defining the machine readable indicia comprises patterning in two or more layers over the substrate.

45. The method of claim 44 wherein said patterning in two or more layers cooperate to define a single machine-readable lidicia encoding said plural first bits of digital data.

46. A method of forming a document, comprising:
  providing a substrate having a face; forming a first patterned layer over the substrate face, the patterning of said first layer defining a machine readable indicia encoding plural first bits of digital data;
  inking over the first patterned layer to form a second patterned layer, the patterning of said second layer providing visible artwork or printing associated with said document;
  the method further including forming a further patterned layer, the patterning of said further layer defining a second machine readable indicia encoding plural second bits of digital data different from said plural first bits.

47. The method of forming a document, comprising:
  providing a substrate having a face;
  forming a first patterned layer over the substrate face, the patterning of said first layer comprising forming voids therein and defining a machine readable indicia encoding plural first bits of digital data;
  inking over the first patterned layer to form a second patterned layer, the patterning of said second layer providing visible artwork or printing associated with said document;
  wherein said voids are formed by laser cutting.

48. A method of forming a document, comprising:
  providing a substrate having a face;
  forming a first patterned layer over the substrate face, the patterning of said first layer defining a machine readable indicia encoding plural first bits of digital data;
  inking over the first patterned layer to form a second patterned layer, the patterning of said second layer providing visible artwork or printing associated with said document;
  wherein the substrate comprises plural layers of polypropylene.

* * * * *